United States Patent [19]

Cetinkaya

[11] Patent Number: 5,409,672
[45] Date of Patent: Apr. 25, 1995

[54] PLUG FLOW REACTION APPARATUS WITH HIGH SHEAR

[75] Inventor: Ismail B. Cetinkaya, Palatine, Ill.

[73] Assignee: UOP, Des Plaines, Ill.

[21] Appl. No.: 168,299

[22] Filed: Dec. 17, 1993

[51] Int. Cl.$^6$ ............................................. B01J 14/00
[52] U.S. Cl. .................................... 422/189; 239/500; 239/427.3; 239/427.5; 761/113; 422/224; 422/228; 422/312
[58] Field of Search ............... 422/146, 228, 224, 312, 422/189; 261/113, 108; 239/500, 427.5, 427.3

[56] References Cited

U.S. PATENT DOCUMENTS

| | | | |
|---|---|---|---|
| 1,239,067 | 9/1917 | Yates | 261/113 |
| 3,028,151 | 4/1962 | Kittel | 261/113 |
| 3,633,882 | 1/1972 | Karakawa | 261/113 |
| 3,633,888 | 1/1972 | Kilian | 422/146 |
| 3,652,450 | 3/1972 | Boyd | 208/146 |
| 3,697,416 | 10/1972 | Carson et al. | 208/146 |
| 3,705,016 | 12/1972 | Ludwigsen et al. | 23/283 |
| 3,723,072 | 3/1973 | Carson et al. | 23/288 R |
| 3,824,080 | 7/1974 | Smith et al. | 23/288 R |
| 4,087,252 | 5/1978 | Strahorn et al. | 23/288 |
| 4,669,890 | 6/1987 | Peyrot | 366/341 |
| 5,017,343 | 5/1991 | Cetinkaya | 422/140 |

OTHER PUBLICATIONS

Power Fluidics, Aea Technology brochure, "Fluidic Mixers For Fast Reactions, Static Mixing for Reaction Engineering, Dispersing and Emulsifying" 4 pages 1992.

Power Fluidics, Aea Technology brochure, "Fluidic Mixers For Long Residence Times, Static Mixing for Reaction Engineering, Dispersing and Emulsifying" 4 pages 1992.

*Primary Examiner*—Amalia L. Santiago
*Attorney, Agent, or Firm*—Thomas K. McBride; John G. Tolomei

[57] ABSTRACT

A tubular reactor uses a plurality of improved mixing devices to reduce the overall length of the tubular reactor while maintaining a low pressure drop operation. The mixing devices in the tubular reactor provide stages of mixing with increased severity. In a preferred form, the mixing device inwardly blends gas and liquid and outwardly discharges the blended gas and liquid in a manner that provides a high shear impact on the liquid and gas.

8 Claims, 1 Drawing Sheet

PLUG FLOW REACTION APPARATUS WITH HIGH SHEAR

FIELD OF THE INVENTION

This invention relates to tubular reactors and to reactor arrangements having means for mixing reactants.

BACKGROUND OF THE INVENTION

There are many homogenous or heterogenous chemical reactions involving liquid and/or gas vapor phases that benefit from the intimate mixing of the reactants in the reaction zone.

This intimate mixing is usually supplied by a tubular reactor. These reactors consist of a long conduit into which the reactants are injected. Mixing of the reactants occur as they flow down the conduit. The design requirements for these reactors include the variables of temperature, degree of mixing and residence time. Direct or indirect heat transfer may be employed to control temperature conditions within the tubular reactor. For example it is known that such reactors may be externally jacketed to circulate a heat exchange medium on the outside surface of an extended reaction conduit and thereby provide indirect heating or cooling over the entire external surface of the reactor.

The primary variables influencing the design of the tubular reactor are degree of mixing and residence time. The length of the conduit or pipe is usually sized to control residence time. The degree of mixing is largely a function of the flow regime within the conduit. In open tubular reactors the diameter largely controls the flow regime therein. Thus optimal velocity for tubular reactions is established when the pipe diameter correctly keeps the flow in the desired flow regime with a pipe or conduit length that is fight to reach the proper residence time for the reaction.

The requirements for mixing and residence time are not always fully compatible, and therefore, the diameter of a tubular reactor may represent a compromise in optimum values to control mixing and residence time. In addition, many tubular reactors require very long pipe lengths at high velocities to achieve the necessary mixing. One means of overcoming the incompatibility in the flow regime or residence time and long length requirements is the use of internal mixers within a tubular reactor or other reaction zone. Internal mixing devices include stirred reactors and static mixers.

In some cases, tubular reactors are also unable to provide the intensity of the mixing that may be important for certain reactions. In order to overcome mass transfer limitations, many reactions that require intimate mixing of reactants also require the mixing be accomplished with a high degree of shear forces between the fluids. The high shear forces create the necessary phase dispersion to overcome mass transfer limitations inherent in the fluids and to provide the contacting necessary for precise reaction control.

Stirred tank reactors in many cases may provide the necessary shear forces to eliminate mass transfer limitations. However, stirred tank reactors often provide unwanted areas of stagnation that allow variations in residence time and degrade the products obtained from certain reactions. In addition, the mechanical elements of stirred tank reactors may prove troublesome. When operating at high pressure, impeller shaft seal leakage is particularly difficult to prevent.

Static mixers are commonly used to supply additional mixing energy to the reactor instead of mechanical stirred reactors. These types of static mixers include simple static mixers, fluidic mixers and vortex mixers. Simple static mixers are effective in forming and dispersing gas bubbles in a statistical distribution. However, the static mixers will not go beyond dispersal of bubbles and provide the shear force that is often necessary for thorough mixing. The fluidic mixers and vortex mixers both provide plug flow conditions that overcome the stagnation encountered with many stirred tank reactors. These types of mixers use pressure drop or pressure pulsations to add mixing energy to the reactors and create the desired degree of mixing. The fluidic mixing devices require high pressure pulsations to give the correct phase dispersion distribution within the reactor. Vortex mixtures use a high pressure drop to create a vortex that blends fluids at high intensity to keep the reactants mixed. Providing high pressure pulsations for fluidic mixing increases the mechanical complexity of the system. Both the vortex mixers and fluidic mixers have substantial energy requirements associated with providing the mixing energy needed to impose high shear conditions on the reactants passing through the reactor. The requirement of high shear forcing for mixing can also cause static mixers to create segregated bubbles within the reactant stream. These segregated bubbles again prevent the creation of the desired uniform mixtures of well-dispersed fluids for passage through the reaction zone.

U.S. Pat. No. 5,017,343 issued to Cetinkaya shows a mixing device that provides mixing of liquid and gaseous streams for the contacting of the mixed components with a fluidized stream of solid material.

BRIEF SUMMARY OF THE INVENTION

It is an object of this invention to provide a tubular type reactor that can provide high shear mixing without the disadvantages encountered with known methods for mixing fluids in stirred reactions.

It is a further object of this invention to improve the operational flexibility of tubular reactors.

This invention is a tubular reactor that passes a flowing stream of reactants through two or more mixing devices that provide intimate mixing of the reactants with a high degree of shear. The mixing apparatus first blends the reactants in a first stage of mixing. The blended components exit the first stage of mixing through orifice openings that direct the blended reactants into an impact zone that further mixes the reactants while imparting a high degree of shear. As opposed to the devices shown in the prior an, the mixing apparatus of this invention can accomplish the blending and high degree of shear with a low amount of pressure drop. The degree of stirring required by the reaction can be intensified by the addition of similar mixing devices positioned along the flow path through the tubular reactor. The additional stages of mixing or shear may be needed to continue mixing components as reactants are produced or to maintain dispersion as additional reagents or catalysts are added between stages of mixing or intermediate fluids are withdrawn from the tubular reactor.

The mixers of this invention combine liquid or liquid and gaseous streams under conditions of sequentially increased mixing severity. The liquid and gaseous components are sequentially mixed, by each mixing device, first in a mild zone that blends the liquid and gaseous components to a uniform consistency. The liquid and gaseous blend is transported to the next zone in a manner that will not resegregate the components. The next mixing stage is of higher severity in that it vigorously mixes the liquid and gaseous blend by impinging it against another stream of the mixture or a contact surface to shear the liquid and promote the formation of fine bubbles within the liquid and gaseous mixture that will not cause segregation of the fine bubbles.

Accordingly, in one embodiment this invention is an apparatus for the plug flow reaction of one or more reactants in the presence of gas and liquid phase fluids. The apparatus includes a containment conduit having an inlet and an outlet end for passing fluid from the inlet end to the outlet end and establishing a flow direction through the conduit. A pair of internal partitions divide the interior of the conduit into an upstream chamber, an intermediate chamber, and a downstream chamber. The upstream chamber is located downstream of the inlet end of the conduit and upstream of the first partition. The intermediate chamber is located between the partitions. The downstream chamber is located downstream of the second partition and upstream of the inlet end of the containment conduit. Means are provided for introducing liquid phase and gaseous phase material into the upstream chamber. A first mixing chamber receives liquid and gaseous phase fluids from the upstream chambers. Means are provided in the first mixing chamber for mixing the liquid and gaseous fluids to form a well-dispersed mixture. Means for communicating the well-dispersed mixture from the first chamber to the intermediate chamber are provided. The means for communicating the well-dispersed mixture into the intermediate chamber also divides the well-dispersed stream into a plurality of discreet streams and directs the projection of each of the discreet streams into impingement with an impact medium in the intermediate chamber. The impact medium comprises at least one of an imperforate wall section or another of the discreet streams. The apparatus includes at least one additional mixing chamber for receiving liquid and gaseous phase fluids from the intermediate chamber. The second mixing chamber has an arrangement that provides the same functions as the first mixing chamber. The apparatus includes means for withdrawing liquid phase and gaseous phase material from the downstream chamber after it has passed through the second mixing chamber.

In a more specific embodiment this invention comprises an apparatus for the plug flow reaction of the reactants through several stages of high shear mixing. The apparatus comprises an elongated conduit having an inlet and outlet end. At least two mixers are located in the conduit between the inlet and outlet ends and are spaced apart within the conduit. The mixers have an arrangement including a transverse plate dividing a portion of the conduit, a mixing conduit fixed to the transverse plate having a first portion extending past the plate in a first direction and a second portion extending past the plate in an opposite direction. A series of apertures defined by the first portion of the mixing conduit converges fluid passing inwardly therethrough into the center of the mixing conduit. A second series of apertures defined by the second portion of the mixing conduit divide and outwardly direct any fluid that exits therethrough. An impact conduit is fixed to the transverse plate and at least partially surrounds the second portion of the mixing conduit. The impact conduit defines a plurality of perforations.

Additional objects, embodiments and details of this invention are disclosed in the following detailed description of the invention.

DETAILED DESCRIPTION OF THE INVENTION

The apparatus of this invention is useful for many tubular reactor applications. Processes suitable for the use of this apparatus will pass liquid or gaseous and liquid phase fluids together through a tubular reactor. The fluid components may be reactants, catalysts, diluents or any other process stream. Processes carried out in the tubular reactor may operate at high or low temperatures in a wide range of pressure conditions including partial vacuums and critical pressure conditions. The fluids passing through the tubular reactor may also include liquids having fine particles dispersed therein. Such solids are usually particulate catalysts.

An example of a suitable process for the reactor of this invention is in the production of linear alfa-olefins by the catalytic dehydrogenation of normal paraffins. A typical process of this type commonly requires contact between two liquid phase streams and one vapor phase stream.

Figure 1:
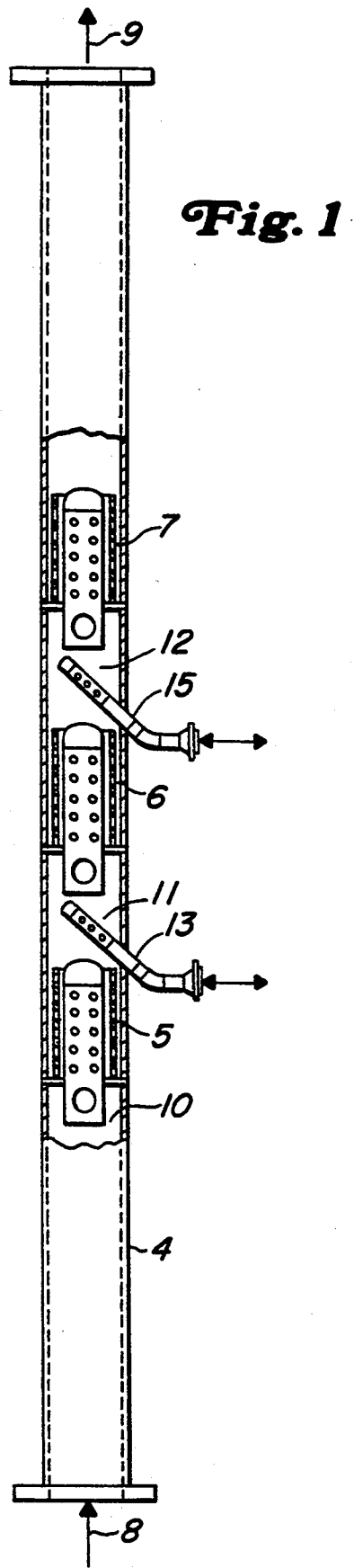
FIG. 1 illustrates a tubular reactor of this invention and shows the mixing device in a cut-away view.

FIG. 1 shows the apparatus of this invention. As depicted in FIG. 1, the apparatus includes an elongated conduit 4 that provides the containment conduit for the tubular reactor. The tubular reactor houses multiple mixing devices 5, 6, and 7. A stream of gas and liquid phase fluids enters the bottom of tubular reactor 4 through an inlet 8 and exits the top of the conduit 4 through an outlet 9. Fluid flowing into the conduit 4 from inlet 8 first enters an upstream chamber 10 defined as the volume between inlet 8 and mixing device 5. As fluid continues to pass upwardly, mixing device 5 mixes the fluid and discharges it into an intermediate chamber 11 defined as the space between mixing devices 5 and 6. Continued upward flow of the fluid passes the fluid through mixing device 6 which further mixes the fluid and discharges it into a downstream chamber 12. Downstream chamber 12 is the volume of conduit a between mixing device 6 and the outlet 9. Both upstream chamber 10 and downstream chamber 12 may contain additional mixing devices. FIG. 1 illustrates downstream chamber 12 with an additional mixing device 7 through which the fluid passes on its upstream course to outlet 9. Apart from means for adding or withdrawing fluids chambers 10, 11, and 12 will provide means for unobstructed fluid flow between mixing devices in the chambers. Thus, the chambers between mixing devices are open for free flow of fluids except for any small intermediate inlet or outlet nozzles as depicted by elements 13 and 15 in FIG. 1.

Intermediate inlet or outlet nozzles may be used to add or withdraw fluids from the conduit 4 at locations intermediate to inlet and outlet ends 8 and 9. Fluids may be added to supply additional reactants or diluents for reaction control. Fluids may also be withdrawn, heated or cooled, and returned to conduit 4 for purposes of temperature control. The addition or withdrawal of fluids through intermediate nozzles 13 and 15 will not ordinarily contribute significantly to mixing or dispersion of the fluids between the mixing devices.

Mixing devices 5, 6 and 7 are the primary means in conduit 4 for providing mixing of the fluids passing therethrough. It has been discovered in this invention that the total pressure drop across the mixing devices can be greatly reduced while still obtaining a good dispersion of fine liquid droplets and gaseous bubbles by the operation of the mixing devices. In this manner the mixing devices blend and homogenize the liquids and gases sequentially in stages of increased mixing severity. The operation of the mixing devices of this invention are enhanced by the presence of the gaseous medium which breaks the liquid up into fine droplets. The invention can operate in a large range of relative liquid to gaseous composition. Preferably, the quantity of gaseous material is at least equal to 0.2 wt. % of the combined mixture.

In operations of the reactor wherein all of the process streams are normally in liquid phase, changes to the process may be effected to promote high shear mixing. The high shear force enhancement of gases may be obtained by injecting an inert gas with the liquids entering the reactor. Injection of the gas with the liquids may be regulated to obtain a controlled level shear force with relatively constant pressure drop.

Looking then at the operation of the mixing devices, as the gaseous medium and liquid enter the conduit 4, they tend to remain segregated. By this invention, the mixture passes through a first mild mixing zone in the mixing device that blends the mixture into a substantially uniform stream. By substantially uniform, it is meant that any major segregation between the liquid and gaseous component that would tend to deliver more liquid or gaseous medium to one section or another of a subsequent mixing stage in the mixing device has been eliminated. Since this blending is usually mild, the pressure drop across this zone will not normally exceed 10 psi.

The liquid and gaseous mixture is then conveyed, in a manner that will not resegregate the liquid and gaseous components, to at least one or more mixing stage that more vigorously mixes the liquid and gas into a homogeneous mixture of liquid with finely distributed bubbles of the gaseous medium throughout the liquid. In order to achieve a more vigorous mixing, this stage will usually require a higher pressure drop than the previous stage. Nonetheless, total pressure drop through this stage will not normally exceed 20 psi.

Figure 2:
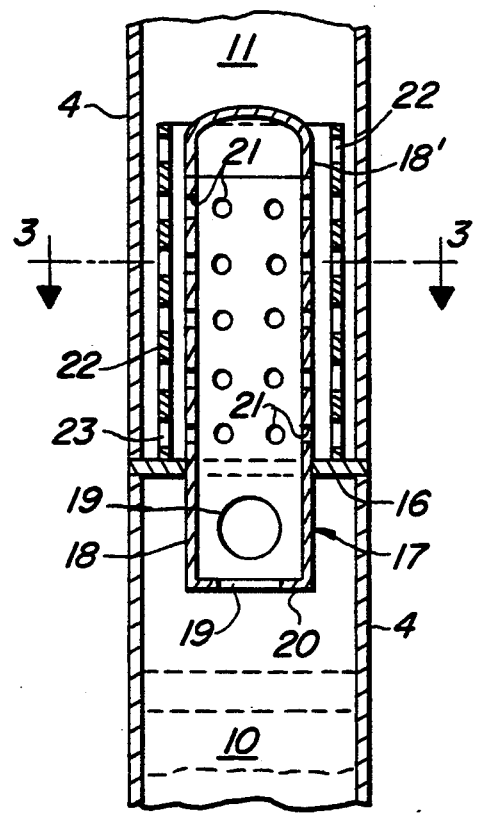
FIG. 2 is an enlarged cross-section of one of the mixing devices shown in the cut-away view of FIG. 1.
Figure 3:
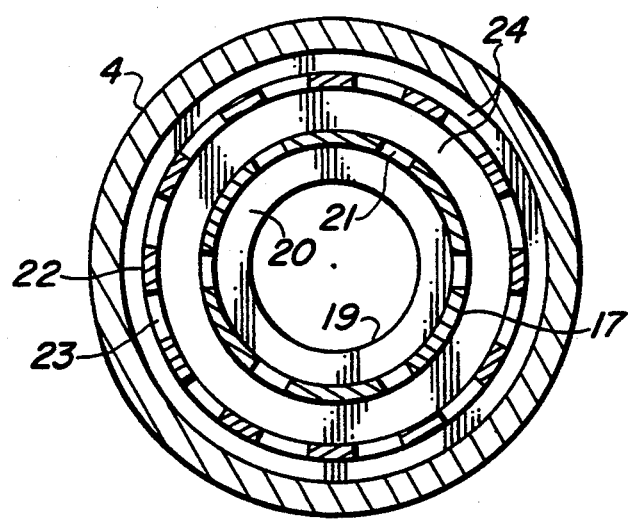
FIG. 3 is a full section of the upper portion of the mixing device shown in FIG. 2.

An example of the arrangement of a specific mixing device for providing the sequential stages of increased severity mixing is shown generally in FIG. 1. FIG. 2 depicts the mixing device 5 in more detail. A partition 16 in the form of a transverse plate divides the interior of conduit 4 into the upstream chamber 10 and the intermediate chamber 11. A mixing conduit 17 pierces partition 16 and has a first portion 18 that projects into upstream chamber 10. As commingled liquid and gas exit chamber 10, first portion 18 defines a plurality of large apertures 19 that receive the commingled fluids into the interior of mixing conduit 17. Apertures 19 consist of one aperture 19 in a bottom closure plate 20 and a number of equally spaced apertures 19 located about the side wall of portion 18. Apertures 19 have inwardly converging projections that intersect at a common point and direct all of the fluid entering conduit 17 at the common point to blend the mixture and provide a zone of mild mixing. The blended mixture of liquid and gas flows into a second portion 18' of mixing conduit 17 and out of conduit 17 through numerous small apertures 21 which divide the blended mixture into a multiplicity of smaller streams that initiate dispersion of the gas through the liquid. Apertures 21 direct the hydrocarbon and gas mixture into impingement with an impact medium which in this case consists of the imperforate portions of impact conduit 22. Together the holes 21, defined by conduit 17 and conduit 22, provide a zone of vigorous mixing in the form of an impingement area. As shown in FIGS. 2 and 3, the impact conduit has perforations or apertures 23 which do not coincide with apertures 21. Therefore, apertures 21 direct the mixture of liquid and gas into imperforate portions of conduit 22. Impact of the mixture with the conduit wall again shears the liquid and breaks up the gas into a dispersion of microbubbles throughout the liquid. The perforations of conduit 22 have a greater open area than the apertures 21 of conduit 17 so that gas and liquid passing through apertures 23 will not impact the interior of conduit 4 with substantial momentum. The homogenized mixture passing out of apertures 21 and 23 flows upwardly through annular regions 24 to either side of conduit and into downstream chamber 11. Well mixed liquid and gas passes from intermediate chamber 11 through tubular reactor 4 in the manner described.

When all of the fluids entering the reactor are in liquid phase the arrangement of mixing devices may be modified to improve the severity of the shear mixing. Decreasing the size of the holes in conduit portions 18' and conduit 22 will increase the velocity of the liquid streams flowing therethrough. The higher velocity of the liquids will increase the shear forces necessary for mixing of all liquid phase fluids. Therefore, when operating the apparatus with all liquid phase fluids it is desirable to use relatively smaller sizes with apertures 21 and 23 than would be used with mixed phase gas and liquid streams.

In this arrangement, sequential mixing of increased severity is provided principally by each mixing apparatus. In and out flow through the mixing conduit 17 conveniently provides collective mixing for blending the entire flow of liquid and gas, and impingement for increased severity mixing. The single mixing conduit allows sequential mixing to be achieved with a relatively small amount of hardware. As a result, repeated mixing can be achieved through multiple mixing devices within a single conduit 4. In a highly preferred embodiment, the apparatus of this invention will have at least 3 and as many as 10 or more of the mixing devices.

Regardless of the number of mixing devices contained within conduit 4, the upstream and downstream chamber will preferably have an open length equal to at least twice the inside diameter of conduit 4. This open length prevents direct injection or direct withdrawal from any of the mixing devices so that each mixing device fully performs its function.

I claim:

1. An Apparatus for the plug flow reaction of one or more reactants in the presence of gas and liquid phase fluids, said apparatus comprising:

a containment conduit having an inlet end and an outlet end for passing fluid from the inlet to the outlet end and establishing a flow direction through said conduit;

b) a pair of partitions transversely disposed in said containment conduit dividing the interior of said containment conduit into an upstream chamber located downstream of said inlet end of said containment conduit and upstream of a first of said partitions, an intermediate chamber located between said partitions and a downstream chamber located downstream of a second of said partitions and upstream of said outlet end;

c) means for introducing liquid phase and gaseous phase fluids into said upstream chamber;

d) a first mixing conduit defining a first mixing chamber for receiving liquid and gaseous phase fluids from said upstream chamber, a plurality of apertures defined by said first mixing conduit and providing said first mixing conduit with an open end for passing said liquid and gaseous phase fluids into the center of said first mixing conduit, means for mixing said liquid and gaseous fluids in said first mixing chamber to form a first mixture, means for communicating said first mixture from said first mixing chamber to said intermediate chamber and dividing said first mixture into a first plurality of discrete streams, and means in said intermediate chamber for directing the projection of each of said discrete streams of said first plurality into impingement with a first impact medium, said first impact medium comprising at least one of an imperforate wall section and another of said discrete streams of said first plurality;

e) a second mixing conduit defining a second mixing chamber for receiving liquid and gaseous phase fluids from said intermediate chamber, a plurality of apertures defined by said second mixing conduit and providing said second mixing conduit with an oven end for passing said liquid and gaseous phase fluids from said intermediate chamber into the center of said second mixing conduit, means for mixing said liquid and gaseous fluids in said second mixing chamber to form a second mixture, means for communicating said second mixture from said second mixing chamber to said downstream chamber and dividing said second mixture into a second plurality of discrete streams, and means in said downstream chamber for directing the projection of each of said discrete streams of said second plurality into impingement with a impact medium, said second impact medium comprising at least one of an imperforate wall section and another of said discrete streams of said second plurality and, f) means for withdrawing liquid phase and gaseous phase fluids from said downstream chamber.

2. The apparatus of claim 1 wherein said downstream chamber is further subdivided by a third partition to provide an additional intermediate chamber.

3. The apparatus of claim 1 wherein said plurality of apertures provide said means for mixing said liquid gaseous fluids.

4. The apparatus of claim 1 wherein said apparatus includes means for adding or withdrawing fluid from said intermediate chamber.

5. An apparatus for the plug flow reaction of a reactant of a reactant through several stages of high shear mixing, said apparatus comprising:

a) an elongate conduit having an inlet and an outlet end, b) at least two mixers located in said conduit between said inlet and ends and spaced apart within said conduit, said mixers comprising:

b1) a transverse plate dividing a portion of said conduit;

b2) a mixing conduit fixed to said transverse plate having a first portion extending past said plate in a first direction and a second portion extending past said plate in an opposite direction wherein said first portion of said mixing conduit has an open end;

b3) a first series of apertures defined by said first portion of said mixing conduit to converge fluid passing inwardly therethrough into the center of said mixing conduit;

b4) a second series of apertures defined by said second portion of said mixing conduit to divide and outwardly direct fluid exiting therethrough; and, b5) an impact conduit fixed to said transverse plate and surrounding said second portion of said mixing conduit, said impact conduit defining a plurality of perforations.

6. The apparatus of claim 5 wherein said elongate conduit contains at least three mixers.

7. The apparatus of claim 5 wherein said second portion of said mixing conduit has a closed end.

8. The apparatus of claim 5 wherein the diameter of said mixing conduit equals at least half the diameter of said elongate conduit.

* * * * *

UNITED STATES PATENT AND TRADEMARK OFFICE
CERTIFICATE OF CORRECTION

PATENT NO. :  5,409,672
DATED      :  April 25, 1995
INVENTOR(S) :  Ismail B. Cetinkaya It is certified that error appears in the above-identified patent and that said Letters Patent is hereby corrected as shown below:

In Column 7, line 35:  change "oven" to --open--.

line 46:  after "with a" insert the word --second--.

Signed and Sealed this

Fifteenth Day of August, 1995

Attest:

BRUCE LEHMAN

Attesting Officer    Commissioner of Patents and Trademarks